Patented Apr. 6, 1954

2,674,547

UNITED STATES PATENT OFFICE 2,674,547

COATED ARTICLE AND PROCESS OF MAKING SAME

Homer W. Paxton and Frank S. Elkins, Passaic, N. J., assignors to United States Rubber Company, New York, N. Y., a corporation of New Jersey No Drawing. Application March 10, 1951, Serial No. 215,029

4 Claims. (Cl. 117—138.8)

This invention relates to coating nylon fabrications, and particularly nylon textile fabrics, with a resinous coating composition. More particularly, the invention relates to a method of so greatly improving the adhesion of styrene-acrylonitrile resinous copolymers to smooth extruded nylon surfaces that coating of such surfaces with such copolymers becomes commercially attractive.

Resin-coated nylon fabrics are extremely desirable for use where a durable weather-proof material is required, particularly for the manufacture of raincoats, tents and the like. However, because the extruded nylon threads from which such fabrics are woven are extremely smooth, few resins have been found which will form a suitably adherent coating on such nylon fabrics. Resins from methacrylic acid esters, and vinyl alcohol esters prepared in an aqueous dispersion, have been found to be substantive to nylon, as shown in U. S. Patents 2,343,089–095. However, these are the only suitable resinous coatings for nylon fabrics which have been developed to any extent commercially.

We have done extensive experimental work with the object of successfully coating nylon fabrics with resinous copolymers of styrene and acrylonitrile. However, we found that the adhesion of coatings of such copolymers to nylon fabrics is extremely poor, so poor, in fact, that such coatings easily chip and peel from the surface of the nylon fabric. It thus became evident to us that styrene-acrylonitrile resinous copolymers when used in the conventional manner were wholly unsuitable for coating nylon fabrics.

The principal object of the present invention is to provide a simple, highly effective and commercially feasible way of coating nylon fabrics with styrene-acrylonitrile resinous copolymers. Another object is to eliminate the poor adhesion of such copolymers to nylon fabrics in a highly efficacious manner. Numerous other objects of our invention will more fully hereinafter appear.

We have discovered that the adhesion of styrene-acrylonitrile resinous copolymers to smooth nylon surfaces, and particularly to fabrics woven or knitted from extruded nylon thread, can be so improved by including in the coating composition containing the styrene-acrylonitrile resinous copolymer a potentially resin-forming phenol-alcohol, typified by 2,6-dimethylol-p-tertiarybutyl-phenol, and heating the coated nylon base to condense the phenol-alcohol to a hardened resinous condition, that use of such styrene-acrylonitrile resinous copolymers for coating nylon becomes commercially important. When the coating composition, comprising the styrene-acrylonitrile resinous copolymer and the potentially resin-forming phenol-alcohol dissolved in a mutual organic solvent, is dried to remove the solvent and is then baked at a suitably elevated temperature, there is formed a coating having a smooth, continuous surface with a hard, glossy finish which adheres extremely tenaciously to the smooth, continuous surface of the nylon threads. Furthermore, the coating of our invention possesses excellent flexing and wear-resistant characteristics. As a result, the coated nylon product of our invention combines the advantageous wear-resisting and other excellent qualities of the nylon base with the good flexing and wear-resisting qualities of our coating and presents a highly desirable article of manufacture.

The styrene-acrylonitrile resinous copolymer used in the practice of our invention is a well-known material made by emulsion polymerization of monomers consisting of a major proportion of styrene and a minor proportion of acrylonitrile, typically containing from 50 to 85% of styrene and correspondingly from 50 to 15% of acrylonitrile.

The resin-forming phenol-alcohols used in the practice of our invention are preferably the acetone-soluble, fusible intermediate products, i. e., the resoles, formed by the condensation of alkyl phenols with aldehydes or aldehyde sources, e. g., formaldehyde, paraformaldehyde, trioxane, etc. These products are usually prepared by condensation in an aqueous alkaline medium. Such resoles are hardenable by heat. We particularly prefer to employ an alkyl dimethylol phenol made in known manner by reacting an ortho- or para-alkylphenol with formaldehyde. This class of resin-forming phenol-alcohols is characterized by having the substituents in the 2-, 4-, and 6-positions only. The alkyl group attached to the ring preferably has not more than 12 carbon atoms in the hydrocarbon chain.

The amount of the resin-forming phenol-alcohol can vary widely, but preferably is such that the amount of the phenolic resin in the final coating ranges from 10 to 50% of the weight of the styrene-acrylonitrile resinous copolymer.

We much prefer to include in the coating composition an acid condensation catalyst which speeds up the resin-forming reaction. Any of the known acid catalysts for condensation of resin-forming phenols can be employed, such as p-toluene sulfonic acid, and trichloroacetic acid. The amount of the catalyst should, of course, be sufficient to effectively catalyze the advancement of the phenol. Typically we employ amounts ranging from 1 to 15% of the weight of the phenol-alcohols.

The styrene-acrylonitrile copolymer, the resin-forming, alkylated phenol-alcohol and, if used, the condensation catalyst, together, if desired, with a non-volatile liquid organic plasticizer for the styrene-acrylonitrile copolymer, are all dissolved in the mutual volatile organic solvent which serves to intimately commingle the several non-volatile ingredients, so that upon evaporation of the solvent they are left in uniform admixture.

If desired, a liquid plasticizer for the resinous copolymer component can be employed. The use of such a plasticizer is advantageous because it increases the flexibility of the resulting coating. Any liquid compound known to be an effective plasticizer for styrene-acrylonitrile resins can be used, the selection thereof constituting no part of the present invention. Any suitable amount of the plasticizer can be used, ranging up to 100% of the styrene-acrylonitrile resin. Any non-volatile, water-insoluble, normally liquid high-boiling compound which is capable of dissolving the styrene-acrylonitrile resin and is miscible with the organic solvent and compatible with the phenol can be employed, examples being esters such as tricresyl phosphate, dioctyl phthalate and dibutyl phthalate.

Instead of using a liquid plasticizer for the styrene-acrylonitrile resin, we can use a normally solid synthetic rubber which is compatible, i. e., miscible in the absence of a mutual solvent, with the styrene-acrylonitrile resin, an example being GR-A (rubbery copolymer of butadiene and acrylonitrile), used in proportions such as are indicated above for the liquid plasticizer.

Any volatile organic liquid which is a mutual solvent for the several components of the coating composition which have been described can be used. Typically we employ a predominately aromatic hydrocarbon solvent such as one containing a major proportion of toluene. Very frequently we prefer to employ also a minor proportion of a non-hydrocarbon solvent, which can be water-miscible, e. g., acetone.

The amount of the volatile solvent used can vary widely so long as it is sufficient to convert the organic film-forming components to a solution having the desired consistency for the particular coating method employed.

Other additives can be incorporated in the coating composition such as fillers, pigments, dyestuffs, etc., the amounts thereof varying within wide limits depending upon the wishes of the operator and the particular coating method and use of the finished product.

*Example*

A mixture of 35 parts of powdered acrylonitrile-styrene copolymer and 35 parts of clay pigment is prepared by melting the copolymer in a Banbury mixer heated to 250° F. and adding an equal weight of clay, portion-wise, while keeping the temperature of the Banbury mixer between 250° and 400° F. The mixing is continued for from five to fifteen minutes, then the charge is removed and allowed to cool. The resultant pigmented copolymer chip is a hard, brittle substance. It is ground to a particle size of ¼ inch or smaller and used in the preparation of the daub.

The daub is prepared by dissolving or dispersing 11 parts of dimethylol-p-tertiarybutylphenol, 70 parts of pigmented copolymer chip prepared as above, and 30 parts of tricresyl phosphate in a mechanically stirred solution of 24 parts of acetone and 96 parts of toluene. The daub thus prepared is a viscous fluid, of a consistency which permits effective knife spreading. Just before the daub is to be used for coating, 2 parts of p-toluenesulfonic acid is dissolved in it to speed up the hardening when the coating is oven-dried.

A woven nylon fabric is employed as the base material, this fabric being woven from threads obtained in the conventional manner by extruding the molten nylon (synthetic linear condensation polyamide of high molecular weight) through tiny orifices and then cold-drawing the extruded filament. The daub is spread on this fabric with a spreading knife to form a thin, continuous coating. The coated material is then dried in an oven at 100° C. for 3 minutes and then for one-half hour at room temperature, to remove the acetone and toluene solvents. The resulting material is then heated in an oven at a temperature ranging from 155° to 185° C. for from 1 to 2 minutes to harden the coating, i. e., advance the phenol-alcohol to the hardened resinous condition, and form the finished product. The bonding between the resulting coating and the nylon base material is excellent. A similar resin coating lacking the dimethylol-p-tertiarybutylphenol can be easily peeled from the nylon fabric after application in the same manner.

A styrene-acrylonitrile coating, prepared in a manner similar to that of the example, but in which the phenolic additive was dimethylol-p-octylphenol also showed improved adhesion to nylon surfaces.

It will be obvious that coatings of a great variety of colors can be obtained by varying the pigment used in the coating composition. For example, a yellow coating is prepared using a chrome yellow pigment in place of the clay.

Those skilled in the art will readily appreciate that any of the conventional coating methods which effect application of a relatively thin continuous coating to the nylon base can be used in the practice of our invention. Those skilled in the art will also appreciate that any method of drying which effects removal of the mutual solvent can be used and similarly that any method of subsequent heat treatment without adversely affecting the properties of the coating or the base because of excessive temperatures, can be employed.

The coating of our invention can be applied to nylon thread, or even to a nylon mono-filament, as well as to woven or knitted nylon fabrics. It can also, if desired, be applied to a continuous form of nylon such as nylon foil or sheet, e. g., nylon which has been extruded or otherwise manipulated into continuous sheet-like form. However, the invention is of greatest importance when the coating is applied to nylon textile fabric having interstices between the threads, in such a way as to form a smooth, continuous, windproof and water-proof coating across the face of the fabric.

The coating obtained by our invention has physical characteristics similar to those of nitrocellulose coatings, namely, good gloss, good flexibility, good surface hardness and good wearing qualities and at the same time is free from the objectionable characteristics of nitrocellulose such as its high inflammability and its poor adhesion to nylon. Our invention is especially advantageous because it adapts the styrene-acrylonitrile copolymers to successful commercially important use for coating nylon and particularly for coating nylon fabrics. Numerous other advantages of our invention will appear to those skilled in the art.

Having thus described our invention, what we claim and desire to protect by Letters Patent is:

1. A new article of manufacture comprising a base of nylon having a smooth surface and, superimposed on said base in direct contact with said surface a thin, continuous, flexible, wear-resisting coating comprising a resinous copolymer of styrene and acrylonitrile and, in intimate, uniform admixture therewith, a hardened phenol-aldehyde resin, said phenol-aldehyde resin being derived from a potentially resin-forming alkyl-dimethylol-phenol substituted in the 2-, 4-, and 6-positions only, the alkyl group attached to the ring of said phenol having not more than 12 carbon atoms, said phenol-aldehyde resin being present in amount ranging from 10 to 50% of the weight of said copolymer.

2. A new article of manufacture comprising a base of nylon having a smooth surface and, superimposed on said base in direct contact with said surface, a thin, continuous, flexible, wear-resisting coating comprising a resinous copolymer of styrene and acrylonitrile and, in intimate, uniform admixture therewith, a hardened phenol-formaldehyde resin, said phenol-formaldehyde resin being derived from 2,6-dimethylol-p-tertiarybutyl-phenol and being present in amount ranging from 10 to 50% of the weight of said copolymer.

3. The process which comprises applying to a base of nylon having a smooth surface, a thin continuous coating of a coating composition comprising a resinous copolymer of styrene and acrylonitrile, 2,6 - dimethylol - p - tertiarybutyl-phenol in amount ranging from 10 to 50% of the weight of said copolymer, a volatile mutual organic solvent for said copolymer and said phenol, and a catalyst capable of accelerating the advancement of said phenol to a hardened resinous condition, drying the resulting coating to remove said solvent, and thereafter subjecting the coated base to a temperature effective to advance said phenol to a hardened resinous condition.

4. The process which comprises applying to a base of nylon having a smooth surface, a thin continuous coating of a coating composition comprising a resinous copolymer of styrene and acrylonitrile, a potentially resin-forming alkyl-dimethylol-phenol substituted in the 2-, 4-, and 6-positions only, the alkyl group attached to the ring in said phenol having not more than 12 carbon atoms, the amount of said alkyl-dimethylol-phenol being equal to from 10 to 50% of the weight of said copolymer, and a volatile mutual organic solvent for said copolymer and said alkyl-dimethylol-phenol, drying said composition to remove said solvent, and then subjecting the coated base to a temperature effective to advance said alkyl-dimethylol-phenol to a hardened resinous condition.

References Cited in the file of this patent

UNITED STATES PATENTS

| Number | Name | Date |
| --- | --- | --- |
| 2,064,360 | Schur | Dec. 15, 1936 |
| 2,125,885 | Bruson | Aug. 9, 1938 |
| 2,163,289 | Pennel et al. | June 20, 1939 |
| 2,253,146 | Spanagel | Aug. 19, 1941 |
| 2,507,665 | Ford | May 16, 1950 |
| 2,530,106 | Warp | Nov. 14, 1950 |
| 2,536,657 | Reese | Jan. 2, 1951 |